US006952736B1

(12) United States Patent
Westbrook (10) Patent No.: US 6,952,736 B1
(45) Date of Patent: Oct. 4, 2005

(54) OBJECT-BASED LOCKING MECHANISM

(75) Inventor: Benjamin M. Westbrook, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/557,740

(22) Filed: Apr. 25, 2000

(51) Int. Cl.[7] ......................... G06F 15/16; G06F 17/30; G06F 12/00
(52) U.S. Cl. ........................... 709/229; 707/8; 710/200
(58) Field of Search ........................... 707/8; 710/200; 709/312, 229, 210

(56) References Cited

U.S. PATENT DOCUMENTS

| 4,399,504 A | * | 8/1983 | Obermarck et al. ......... 710/200 |
| 5,566,302 A | * | 10/1996 | Khalidi et al. .............. 709/312 |
| 5,734,909 A | * | 3/1998 | Bennett ....................... 710/200 |
| 5,761,659 A | * | 6/1998 | Bertoni .......................... 707/8 |
| 5,794,241 A | * | 8/1998 | Loaiza ........................... 707/8 |
| 6,026,401 A | * | 2/2000 | Brealey et al. ................. 707/8 |
| 6,141,720 A | * | 10/2000 | Jeffords et al. ............. 710/200 |
| 6,389,420 B1 | * | 5/2002 | Vahalia et al. .................. 707/8 |
| 6,442,601 B1 | * | 8/2002 | Gampper et al. ........... 709/218 |

* cited by examiner

Primary Examiner—William A. Cuchlinski, Jr.
Assistant Examiner—Michael Delgado
(74) Attorney, Agent, or Firm—Shook, Hardy & Bacon, L.L.P.

(57) ABSTRACT

An object-based locking mechanism is disclosed in which the requesting and granting of access to data is decoupled by the use of methods to regulate the data access. In one embodiment, a client object calls a request lock method of a server object when it desires access to data regulated by the server object. When the server object decides to grant access, it calls a lock granted method of the client object. Within the scope of the lock granted method, the client object has access to the data; when the client object returns the lock granted method, access is released. An object queue to manage data access with respect to a number of client objects for a server object is also disclosed.

9 Claims, 5 Drawing Sheets

OBJECT-BASED LOCKING MECHANISM

FIELD OF THE INVENTION

The invention relates generally to locking mechanisms for governing access to data, and more particularly to such locking mechanisms that are object-based.

BACKGROUND OF THE INVENTION

Within computing environments, there may be a single owner, or server, of data responsible for managing access to the data by a number of different clients. Regulating access to the data is necessary so that the data is not corrupted. For example, in the context of database systems, if two different clients desire to modify the same record of data at the same time, there is great potential for the data to be corrupted. Therefore, generally, the server provides for a locking mechanism so that the clients can have access to the data, without corrupting it.

Generally, read-only access can be provided on a non-exclusive basis by the server to the clients. That is, any number of clients can at the same time have read-only access to the data. However, read-and-write access to the data usually must be provided on an exclusive basis, such that if one of the clients is writing—for example, modifying—the data, then no other clients can simultaneously have either read-and-write access or read-only access to the data. This is necessary so that the data does not become corrupted. Within database systems, for example, such read-only and read-and-write access is typically regulated on a record-by-record basis.

The prior art generally provides for polling as a mechanism by which access is requested by clients and granted by a server. When a client desires access to the data, it polls the server. The server must then immediately grant or deny the client the desired access. If the server has denied the client access, then the client typically must enter into a loop in which it waits for a while, and then re-polls the server. Such a situation is sometimes referred to within the prior art as a spinlock. When the server finally grants the client access, the client has what is referred to as a lock on the data—for example, either a read-only lock, or a read-and-write lock. When the client does not need the granted access to the data any longer, it then calls the server to return the lock, which is also known as unlocking the access.

This locking and unlocking approach within the prior art, however, has several disadvantages. It is inefficient: clients must commonly poll the lock repeatedly in order to obtain access to the data. The prior art also approach does not provide for server-governed timing control of data access: when a client requests access to the data, the server must immediately grant or deny the request; the server does not have the option, for example, of delaying granting the request. For these and other reasons, therefore, there is a need for the present invention.

SUMMARY OF THE INVENTION

The invention relates to an object-based locking mechanism. In one embodiment, a client object calls a request lock method of a server object when it desires access to data regulated by the server object. When the server object decides to grant access, it calls a lock granted method of the client object. Within the scope of the lock granted method, the client object has access to the data; when the client object returns the lock granted method, access is released.

Embodiments of the invention provide for advantages not found within the prior art. A server object has the option of delaying granting access to a client object, by waiting until it decides to call the lock granted method of the client object. A client object does not have to repeatedly poll a server object—it calls the request lock method of the server object, knowing that the server object will at some time call its lock granted method to grant access. Thus, as compared to the prior art, embodiments of the invention utilize methods to lock and unlock data, such that the requesting and granting of data access are decoupled from one another.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
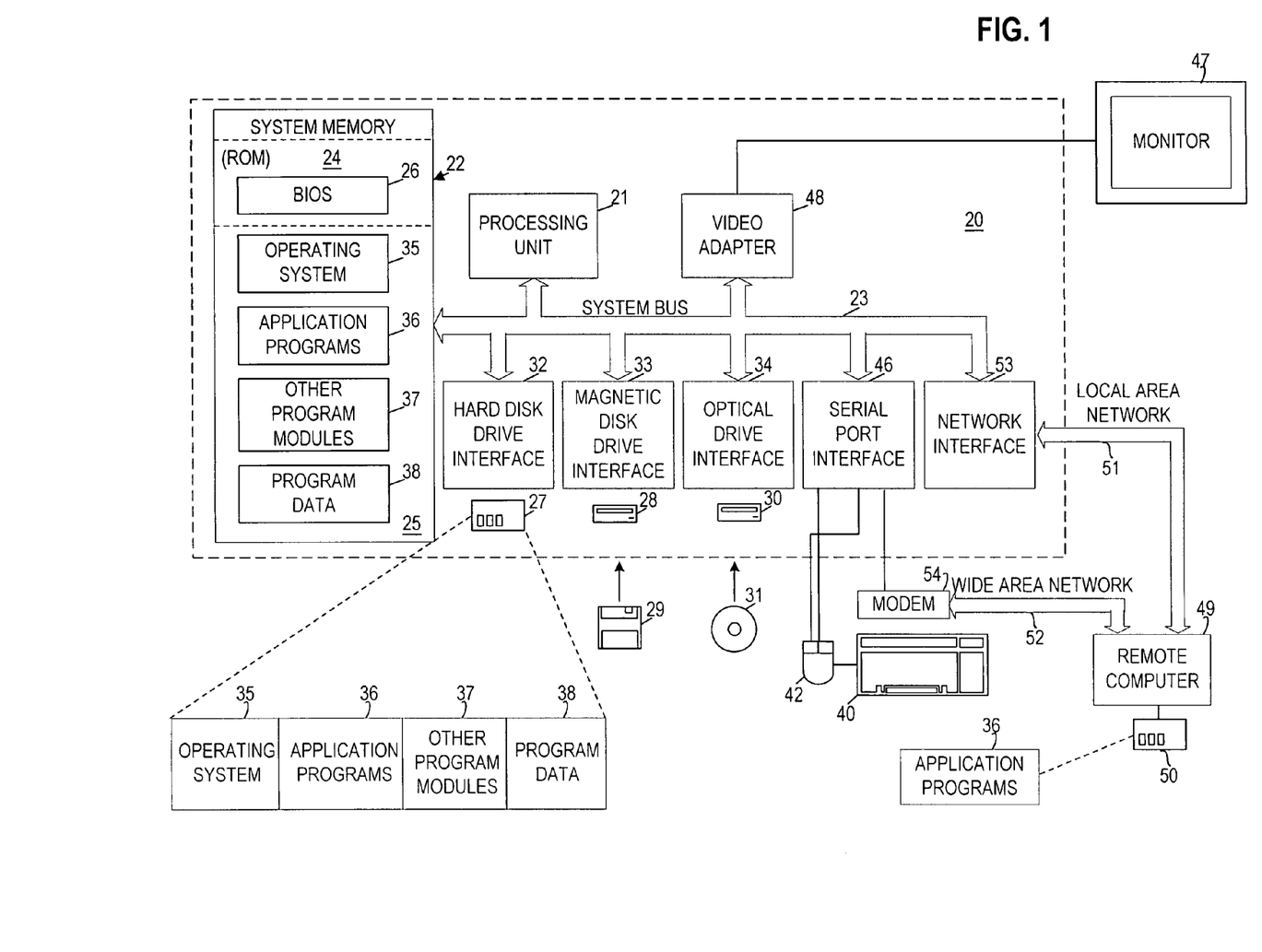
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Object-Based Locking Mechanism

Figure 2:
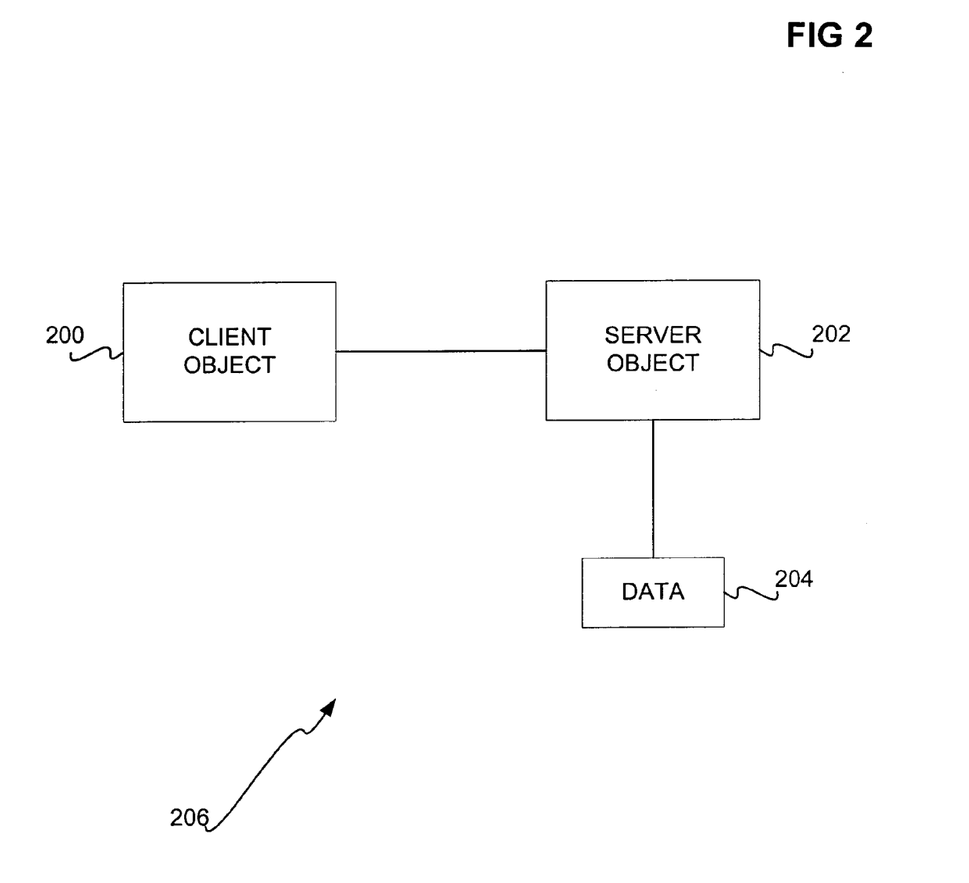
FIG. 2 is a diagram of a system according to an embodiment of the invention.

In this section of the detailed description, an object-based locking mechanism according to an embodiment of the invention is described. In the next section, an extension of this mechanism, according to another embodiment of the invention, is described. Referring to FIG. 2, a diagram of a system 206 according to an embodiment of the invention is shown. The system 206 includes a client object 200, and a server object 202 that governs access to data 204. Each of the objects 200 and 202 can in one embodiment be a software component as known within the art, such as a Microsoft Component Object Model (COM) object, a Java object known as a Java Bean, etc.; the invention is not so limited. That is, in one embodiment, each of the objects 200 and 202 can be a computer program executed by a processor from a computer-readable medium such as a hard disk drive or a memory. The data 204 to which the server object 202 governs access is not limited by the invention, and can include, for example, database records, content such as text-oriented documents, etc. Those of ordinary skill within the art will appreciate that the system 206 can include more than one client object 200 and/or more than one server object 202; however, for sake of illustrative clarity only, only one of each type of object is shown in the system 206 of FIG. 2.

The client object 200 has a lock granted method implemented on it, and the server object 202 has a request lock method implemented on it, which are explained by way of their functionality as is now described. When the client object 200 desires access to the data 204 to which the server object 202, the client object 200 calls the request lock method of the server object 202. This call means that the client object 200 is interested in receiving access to the server object 202. For example, such access can be read-only access, or both read-and-write access.

Once the server object 202 has received this call, it is able to determine when to grant the access to the client object 200, and need not do so immediately. For example, if another client object already has read-and-write access to the data, such access is typically exclusive, such that the server object 202 will not grant access to the client object 200 until this other client object is finished with the data. As another example, if another client object already has read-only access to the data, and the client object 200 is only requesting read-only access to the data, too, then the server object 202 typically will grant access to the client object 200 immediately, since read-only access can be accomplished in a non-exclusive manner without corrupting the data 204. However, if the client object 200 is requesting read-and-write access to the data 204, then typically the server object 202 will wait until access by any other client object is finished until it grants the client object 200 this type of access.

The server object 202 grants access to the client object 200 by calling the lock granted method of the client object 200. Within the scope of this method, the client object 200 has the access it had requested to the data 204, such as read-only or read-and-write access. When the client object 200 is finished with the data 204, it then returns the lock granted method. This is an automatic indication to the server object 202 that the data 204 has been unlocked—that is, that the access that had been requested by and granted to the client object 200 is finished. Thus, locking and unlocking of access to the data is accomplished by the methods of the objects 200 and 202. The client object 200 calling the request lock method of the server object 202 serves to indicate to the server object 202 that the client object 200 desires a lock on the data 204, while the server object 202 calling the lock granted method of the client object 200 indicates that the lock has been granted. Return from the lock grant method by the client object 200 then indicates that the lock has been removed, or unlocked.

Figure 3:
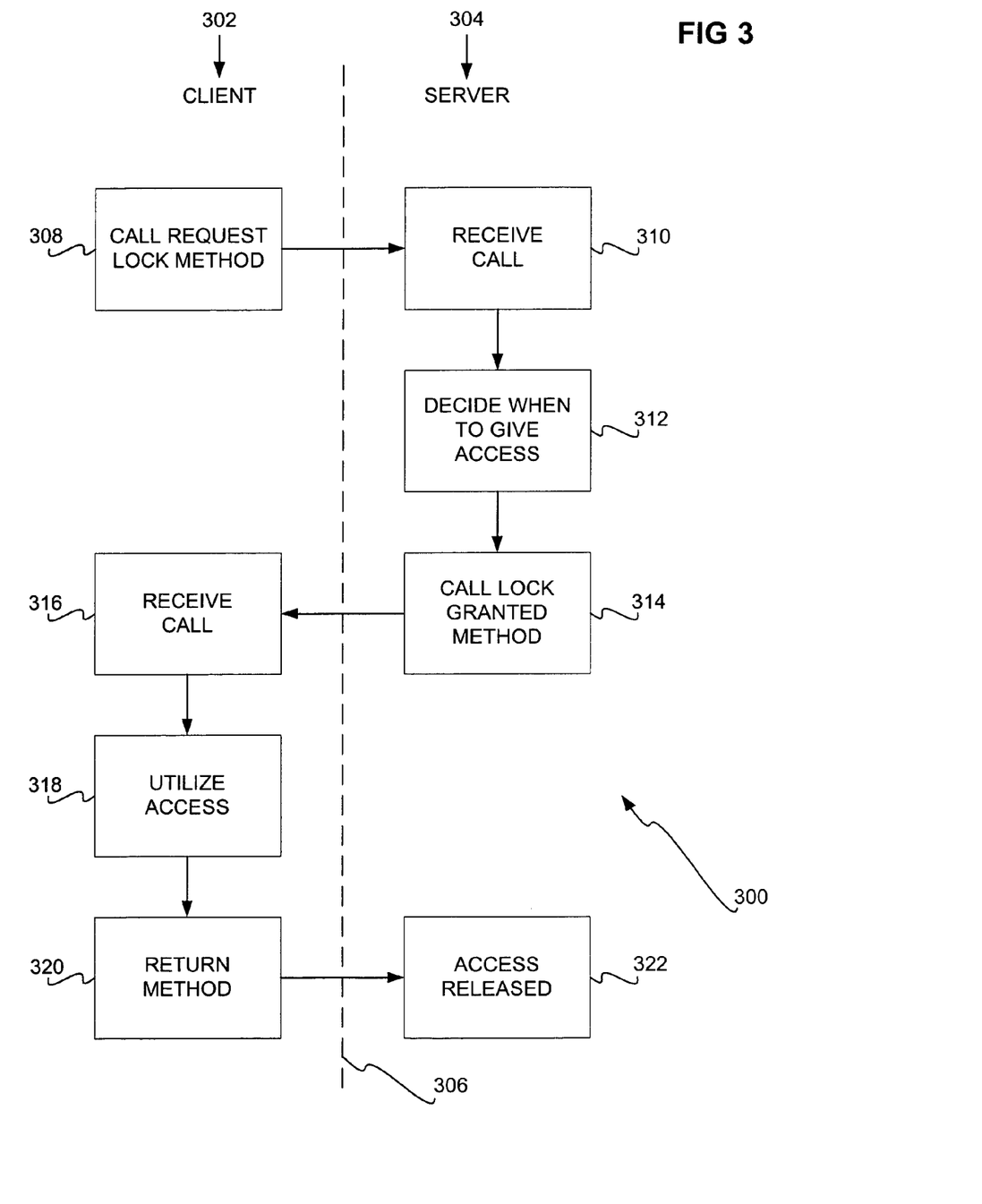
FIG. 3 is a flowchart of a method according to an embodiment of the invention.

Referring next to FIG. 3, a flowchart of a method 300 according to an embodiment of the invention is shown. The method can in some embodiments be computer-implemented. A computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The program or programs can be a part of a computer system or a computer, such as that described in conjunction with FIG. 1 in a previous section of the detailed description. The invention is not so limited, however. Some parts of the method 300 are performed by a client object, as indicated by those parts in the column 302 to the left of the dotted line 306, while other parts of the method 300 are performed by a server object, as indicated by those parts in the column 304 to the right of the dotted line 306.

When a client object desires access to the data governed by a server object, in 308 it calls the call request lock method of the server object, which is received by the server object in 310. The server object then, in 312, decides when to give access to the client object. When it does so, it calls the lock granted method of the client object in 314, which is received by the client object in 316. The client object, as shown in 318 of FIG. 3, then utilizes the access to the data—for example, reading the data, writing to the data, etc., within the scope of the access granted. When the client object is finished with the data, it returns from the method in 320. As shown in 322, this means that the access that had been granted to the client object is released.

Object Queue and Proxy

In this section of the detailed description, an extension to the embodiment of the invention of the previous section of the detailed description is described. In particular, the extension relates to using an object queue to manage access to the data governed by a server object, such that the server object does not have to deal with a number of client objects desiring access to the data, but rather only has to deal with object queue. The object queue thus acts as a proxy between the client objects and the server objects. This embodiment of the invention is described with reference to FIGS. 4 and 5. In one embodiment, the object queue is part of a common text framework that negotiates access to documents owned by application programs (having server objects) and input device handlers (or, drivers or processors, and having client objects), such as the common text framework described in the copending, cofiled and coassigned patent application Ser. No. 09/557,737, entitled "Common Text Framework". However, the invention itself is not so limited.

Figure 4:
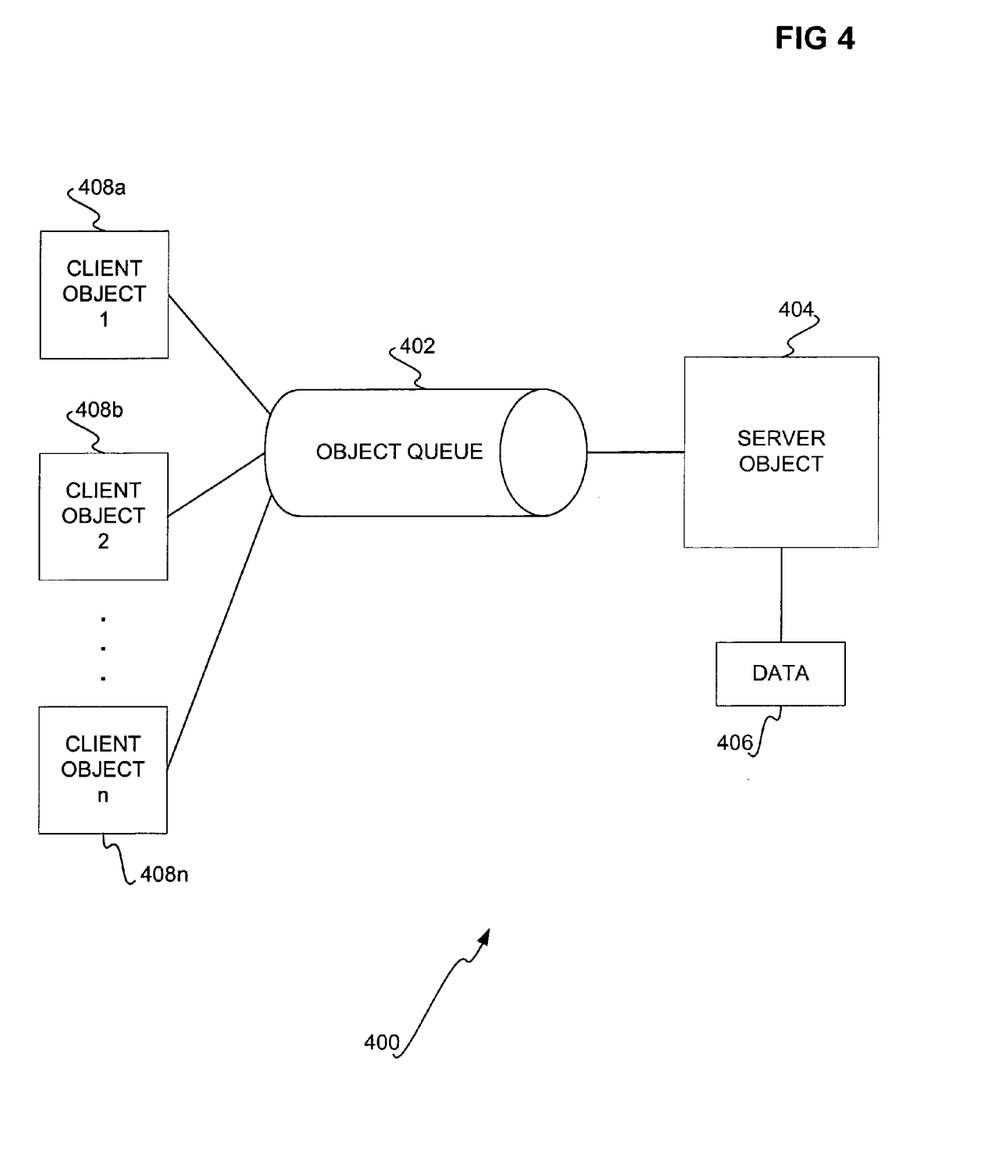
FIG. 4 is a diagram of a system according to another embodiment of the invention; and, FIG. 5 is a flowchart of a method according to another embodiment of the invention.

In the diagram of FIG. 4, the system 400 includes an object queue 402, a server object 404 governing access to the data 406, and a number of client objects 408a, 408b, ..., 408n. Each of the client objects 408a, 408b, ..., 408n has a client lock granted method. The server object 404 has a server request lock method. The object queue 402 manages the access to the data 406 governed by the server object 404, and has a proxy lock granted method and a proxy request lock method. These methods are similar in functionality to their corresponding lock granted and request lock methods of the previous section of the detailed description, but are explained particularly by way of description as now follows.

When one of the client objects 408a, 408b, . . . , 408n desires access to the data 406 as governed by the server object 404, such as read-only or read-and-write access, the client object calls the proxy request lock method of the object queue 402. The object queue 402 then determines whether it currently is waiting for access to the data 406 governed by the server object 404. If it is, then it waits for the access to be granted; otherwise, it requests access to the data 406, and then waits for access to be granted. Once access is granted, the object queue 402 calls the client lock granted method of the object, and the access to the data 406 by the client object is accomplished through the object queue 402's own access to the data 406. In one embodiment, the only type of access the object queue 402 has to the data 406 governed by the server object 404 is read-and-write access (although, in other embodiment, this is not the case, as is described below); however, since client objects can request read-only access, the object queue 402 in such an embodiment ensures that the client objects' utilization of the data 406 is consistent with the type of access that they had requested and which has been granted. The invention is not limited to this embodiment, however. The access to the data 406 by the client object is accomplished through the object queue's 402 own access to the data 406, such that the object queue 402 desirably supervises the access so that, for example, if the access given to the client object is read only, the client object does not overstep its bounds and attempt writing to the data.

It is noted that in one embodiment, the read-and-write access to the data 406 by the object queue 402 can initially be read access, and then read-and-write access. Thus, the queue 402 can ask only for a read lock at first if this is what the initial client object desires. If the server object 404 has not granted the lock yet by the time a second client object asks for write (and read) access, the queue 402 can again ask for access, but this time for read and write access. When the server object 404 is ready to give access, it must now grant write (and read) access. This is because in this embodiment, the server object 404 only makes a single lock granted call, no matter how many times the queue 402 (or any other client) asks for access. Thus, in this embodiment, write access is not requested by the queue 402 unless it is needed.

If another client object desires access, it follows the procedure that has been described. Requests for client object access to the data 406 are generally lined up in the object queue 402. The object queue 402 in one embodiment operates in a first-in, first-out (FIFO), such that requests for access that arrive at the queue 402 are handled in the order in which they are received. The object queue 402 desirably allows as many client objects to have access to the data 406 as is possible given the current client object(s) that have access. For example, if a given client object already has been granted read-only access to the data 406, then if the next client object in the queue 402 also desires read-only access to the data 406, the object queue 402 is likely to grant it. As another example, if one or more client objects already have read-only access to the data 406, and another client object desires read-and-write access, then the object queue 402 will wait until all the read-only access has been released before granting the read-and-write access.

The nature of the access to the data 406 between the object queue 402 and the server object 404 is now described in more detail. As has been noted, in one embodiment, the object queue 402 requests only read-and-write access to the data 406 (although in another embodiment, as has been described, this is not the case). The queue 402 makes this request when it is not waiting for access to the data 406, and receives a request, either for read-only or read-and-write access, from a client object. The queue 402 maintains the access it has to the data 406 with the server object 404, until at some point the object queue 402 becomes empty of further client object access requests, at which time it returns the proxy lock granted method to release the access (likewise, it is noted that when a client is finished with access, it returns its client lock granted method to release its access). Thus, as client objects continually request access to the data 406, without the queue 402 becoming empty, the initial access by the queue 402 to the data 406 is maintained, until the queue 402 becomes empty. Desirably, in one embodiment, the only time the object queue 402 releases its access to the data 406 is when the queue 402 is empty.

The reason why the object queue 402 requests only read-and-write access to the data 406 is now explained by way of example (although, as has been noted, in one embodiment, the queue 402 requests read access when only such access is necessary). Assume a first client object desires read access to the data 406. The object queue 402 requests and is granted access to the data 406 by the server object 404. While the first client object is utilizing its access, a second client object calls the object queue 402 asking for both read-and-write access to the data 406. When the first client object is finished with its access, the object queue 402 can then pass the second client object's request through the queue 402's current access to the data 406 only if this access is read and write. If it were only read access, for example, then the queue 402 would be forced to release its read-only access on the data 406, and immediately request read-and-write access, which causes unnecessary communication between the object queue 402 and the server object 404. Thus, instead, the object queue 402 only maintains read-and-write access to the data 406 in one embodiment, and ensures that the utilization of the access by client objects is consistent with the type of access that they had initially requested (either read-only, or read-and-write access, for example).

It is noted that the above embodiment of the invention implicitly assumes that requests by the client objects are asynchronous, such that they can be granted by the object queue (and hence ultimately by the server object), without concern as to timing. However, sometimes synchronous access is necessary—that is, sometimes the clients need immediate access (or be denied access). Therefore, in one embodiment, the proxy request lock method has a flag that can be set by a client object to demand an immediate call to the client lock granted method within the scope of the proxy request lock method. In such instance, the object queue will determine whether such access can be immediately granted, and thus will either grant access immediately or return failure; that is, such requests are not queued by the object queue. In one embodiment, synchronous lock requests are always handled before any other pending requests in the queue.

Figure 5:
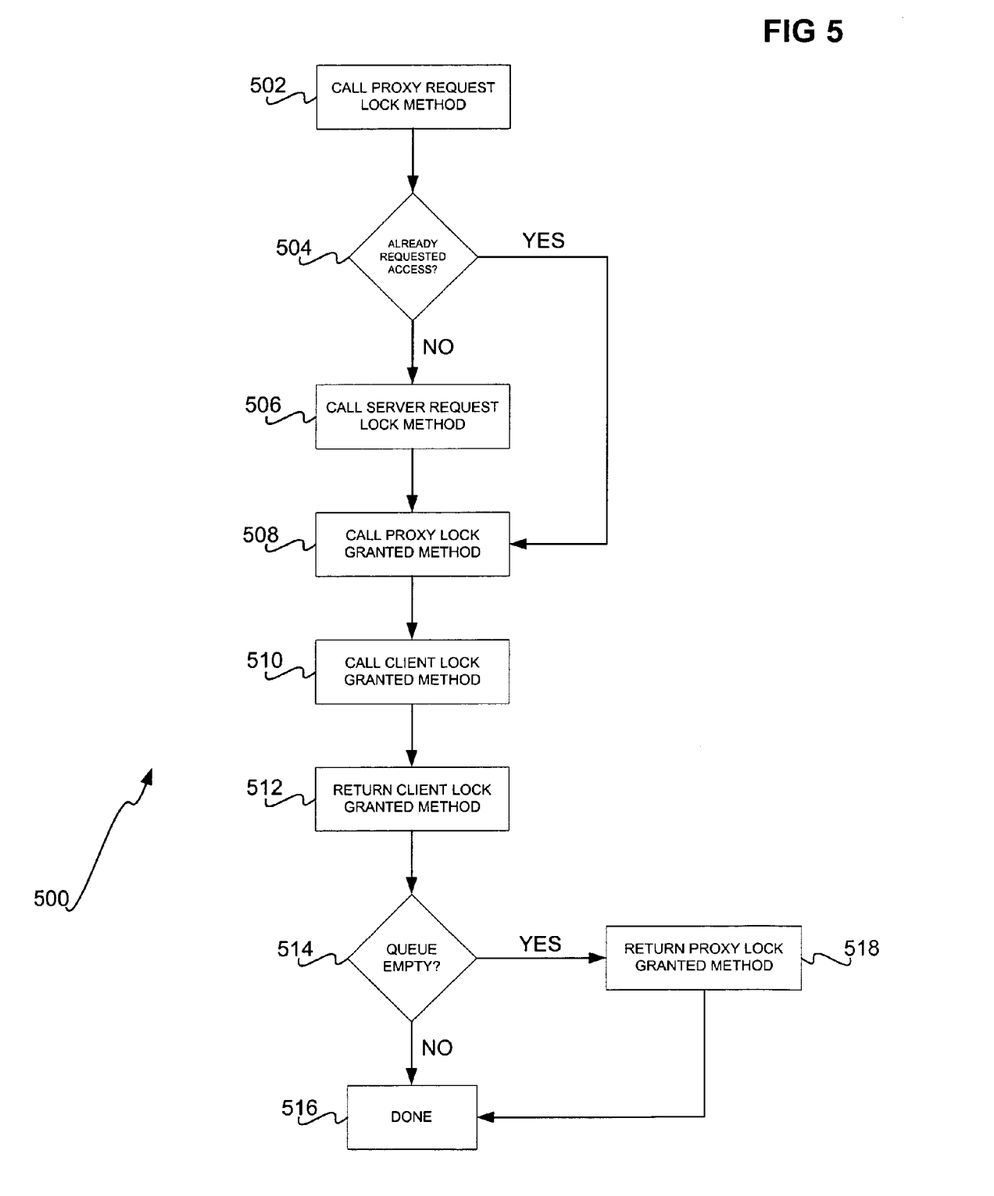

Referring next to FIG. 5, a flowchart of a method 500 according to an embodiment of the invention is shown, which is consistent with the embodiment of FIG. 4 just described. The method can in some embodiments be computer-implemented. A computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The program or programs can be a part of a computer system or a computer, such as that described in conjunction with FIG. 1 in a previous section of the detailed description. The invention is not so limited, however.

In 502, a client object calls a proxy request lock method of an object queue to request client access to data that is ultimately managed and governed via a server object, as has been described. The client access can be for read-only access, or read-and-write access. The object queue receives this call, and in 504, determines whether it currently is waiting for proxy access to the data directly from the server object (the terms "proxy access" and "client access" are used herein only to distinguish access to the data of the server object by the object queue—proxy access—and access by a client object—client access). If not, then the object queue calls a server request lock method of a server object in 506. The server object receives this call, and when it decides to grant the access to the object queue, it calls a proxy lock granted method of the object queue in 508. At this time, the object queue has access to the data, and thus is able to grant the client its access, which is done in 510 by the object queue calling the client lock granted method of the client object. It is noted that if the object queue had access currently in 504, then the method immediately proceeds to 508, where the server object calls the proxy lock granted method when it desires to grant access.

The proxy access is in one embodiment always read-and-write access, as has been described (although, as has also been described, this is not the case in another embodiment), such that the object queue manages the client object's access to the data to ensure that the client object does not, for example, write to the data when it only has read-only access to the data. At some point, the client object is finished with its access to the data, such that, in 512, it returns from the client lock granted method, which releases its access to the data. In 514, the object queue determines if the queue is empty of further requests from client objects for access to the data. If so, then the object queue releases its proxy access to the data by returning from the proxy lock granted method in 518, and the method is finished in 516. If the queue is not empty, then the method is finished in 516 as well. That is, the queue object can continue with managing the client requests of other client objects, which each essentially results in the performance of the method 500 of FIG. 5 for a particular client request.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and equivalents thereof.

What is claimed is:

1. A computerized system comprising:
   at least one client object, each client object having a client lock granted method;
   a server object governing access to data having a server request lock method;
   an object queue functionally positioned between the server object and the at least one client object to manage the access to the data governed by the server object by having a proxy lock granted method and a proxy lock request method,
   such that a client object requests the access to the data by calling the proxy request lock method of the object queue, the object queue then calling the server request lock method of the server object, the server object then calling the proxy lock granted method of the object queue, and the object queue then calling the client lock granted method of the client object.

2. The system of claim 1, wherein the access is released by the client object when the client object returns the client lock granted method.

3. The system of claim 1, wherein the access is released by the object queue then the object queue returns the proxy lock granted method.

4. The system of claim 1, wherein the access requested by the client is one of read-only access and read-and-write access.

5. A computer-implemented method comprising:
   calling by a client object of a proxy request lock method of an object queue requesting client access to data ultimately managed via a server object;
   upon determining by the object queue that the object queue currently is not waiting for proxy access to the data, calling by the object queue of a server request lock method of the server object requesting the proxy access;
   when the server decides to grant the access to the object queue, calling by the sever object of a proxy lock granted method of the object queue; and,
   calling by the object queue of a client lock granted method of the client object.

6. The method of claim 5, further comprising returning by the client object of the client lock granted method, such that the client access by the client object is released.

7. The method of claim 6, further comprising upon determining by the object queue that the object queue is empty of client requests, returning by the object queue of the proxy lock granted method, such that the proxy access by the object queue is released.

8. The method of claim 5, wherein the client access comprises one of read-only access and read-and-write access.

9. The method of claim 5, wherein the proxy access consists of red-and-write-access.

* * * * *